United States Patent [19]
Lauck

[11] 3,907,591
[45] Sept. 23, 1975

[54] POSITIVE SULPHUR ELECTRODE FOR GALVANIC CELLS AND METHOD OF PRODUCING THE SAME

[75] Inventor: Helmut Lauck, Schlossborn, Germany

[73] Assignee: Varta Aktiengesellschaft, Frankfurt am Main, Germany

[22] Filed: Oct. 22, 1974

[21] Appl. No.: 516,902

Related U.S. Application Data

[62] Division of Ser. No. 319,726, Dec. 29, 1972, abandoned.

[30] Foreign Application Priority Data
Dec. 30, 1971  Germany............................ 2165634

[52] U.S. Cl............................ 136/6 LN; 136/100 R
[51] Int. Cl.² ........................................ H01M 35/00
[58] Field of Search .............. 136/6 LN, 20, 100 R; 423/567; 106/70

[56] References Cited
UNITED STATES PATENTS

| | | | |
|---|---|---|---|
| 2,460,365 | 2/1949 | Schallis | 423/567 |
| 2,462,146 | 2/1949 | Walcott et al. | 423/567 X |
| 2,569,375 | 9/1951 | Grove | 423/567 X |
| 2,757,075 | 7/1956 | Haimsohn | 423/567 X |
| 2,996,562 | 8/1961 | Meyers | 136/6 LN |
| 3,248,265 | 4/1966 | Herbert | 136/6 LN |
| 3,413,154 | 11/1968 | Rao | 136/100 R |
| 3,463,670 | 8/1969 | Rao et al. | 136/100 R X |
| 3,532,543 | 10/1970 | Nole | 136/6 LN |
| 3,806,369 | 4/1974 | Dey et al. | 136/6 LN |

*Primary Examiner*—John H. Mack
*Assistant Examiner*—C. F. Lefevour
*Attorney, Agent, or Firm*—Herbert L. Lerner

[57] ABSTRACT

Positive sulphur electrode is formed of amorphous, insoluble sulphur with an additive of conductive material, and is produced by a method which includes heating crystalline sulphur quenching it and extracting it with a solvent so as to transform it into pulverulent amorphous, insoluble form, admixing a conductive material with the pulverulent insoluble sulphur, and applying the mixture at high pressure to a support.

4 Claims, No Drawings

POSITIVE SULPHUR ELECTRODE FOR GALVANIC CELLS AND METHOD OF PRODUCING THE SAME

This is a division, of application Ser. No. 319,726, filed Dec. 29, 1972, now abandoned.

The invention relates to a positive sulphur electrode for a galvanic cell having a negative electrode of light metal and an electrolyte containing an organic solvent, wherein a stabilizer and/or a salt may be dissolved, if necessary, to increase the electrical conductivity. The invention also relates to a method of producing the foregoing electrode.

Cells with positive sulphur electrodes and electrolytes containing organic solvents have already been known heretofore from German Prosecuted Published Applications DAS No. 1 671 843, 1 935 941, 1 126 464, from the U.S. Pat. No. 3,532,543, and French Pat. No. 1 524 209. The cells described therein have the disadvantage that the sulphur is contained as a positive active mass, which is soluble in the aforementioned solvents. Cells, which are formed of such material have, as a consequence thereof, a high self-discharging rate, because the sulphur reacts with the negative electrode material.

Furthermore, the porosity of the aforedescribed positive electrode is often inadequate, so that the diffusion of the electrolyte into the electrode is greatly hampered by the reaction products which are poorly soluble in the electrolyte and are precipitated on the electrodes during discharge of the cell. Poor discharge effects consequently result therefrom.

It is an object of the invention to provide a positive sulphur electrode for a galvanic cell of the aforementioned type which has a good storage capacity and high current output with minimal polarization, and it is a further object of the invention to provide a method of producing these sulphur electrodes economically.

With the foregoing and other objects in view, there is provided in accordance with the invention, a positive sulphur electrode comprising a member formed of amorphous, insoluble sulphur having an additive of conductive material.

In accordance with the method of the invention, the active positive mass on the electrode is transformed to a form that is insoluble in the electrolyte. The porosity of the electrode is increased through an extraction treatment with a solvent, which dissolves the quantity of sulphur that remained undissolved during the process, and a stabilizer is added to the positive mass or to the electrolyte.

As is known, sulphur can be transformed to amorphous, insoluble state by heating above 140° C, quenching by pouring into a cold liquid and extraction with a solvent, and then it can be treated together with other components to form an electrode. It is advantageous, however, to produce an electrode member from commercial crystalline sulphur, a conductive material, and a binder if necessary, and to heat this member to a temperature above 140°C, to quench it rapidly by immersing it into a cooled liquid and to extract any soluble remainder of sulphur with the aid of a solvent. The electrolyte of a galvanic cell in which such sulphur electrode is contained is formed of an organic solvent, a bortrihalogenide, and/or a conductive salt. Examples of suitable organic solvents are propylene carbonate, butyrolactone, dimethylsulfoxide, 1-methyl-2-pyrrolidone, tetrahydrofurane, ethylene-glycoldimethylether or mixtures thereof. Examples of conductive salts that may be used are perchlorate, hexa-fluorophosphate, hexa-fluoroarsenate, hexa-fluoroantimonate, tetra-fluoroborate, aryl- or alkyl-phosphonium, or aryl- or alkylammonium salts, and rhodahide. Since the addition of bortrihalogenide has a stabilizing effect upon the amorphous sulphur, in most cases, when bortrihalogenide is present the addition of a further stabilizer can be dispensed with. In addition thereto, the solubility of the compounds which are formed during the discharging process is increased by the bortrihalogenide in the electrolyte, and premature clogging of the pores on the surface of the positive electrode is consequently prevented. Simultaneously, the bortrihalogenide prevents formation of polysulfides during the discharging process, and considerably increases the current output. In the following examples, the electrode of the invention and the method of producing the same are further explained:

Commercial sulphur powder is heated for a short period to 150° – 200° C, and the resulting melt is then immediately poured into cooled water. The consequently solidified sulphur is then pulverized and dried in vacuum at ambient or slightly increased temperature. After completion of the drying operation, the sulphur powder is subjected to extraction by carbondisulfide until the weight of the insoluble sulphur no longer decreases. The adhering carbon disulfide is removed in vacuum at ambient temperature, and the insoluble sulphur powder is mixed with a small amount of a stabilizer about 0.1% to 1% by weight referring to the total weight of the positive mass. Afterwards pulverized graphite is blended therewith, so that the ratio by weight of sulphur and graphite at maximum is 1 : 1. It is possible to substitute, metal powder as conductive material for part of the graphite. After the admixture of a small amount of poly-isobutylene (about 1% by weight) dissolved in benzine and an addition of flakes of cellulose, (about 1.5% by weight) the mass intimately and thoroughly kneaded and then coated on a support or carrier, (0.1 gr per cm$^2$) such as expanded nickel-metal or nickel metal mesh with conductors, for example. After pasting of the electrode, the material is again dried in vacuum. The dried electrode mass is thereafter pressed onto the support with a pressure of from 400 – 600 kg/cm$^2$.

To produce negative electrodes, light metal such as sodium, calcium, beryllium, magnesium, or aluminum is used; preferably, a layer of lithium having a thickness of about 0.5 mm is pressed onto a nickel mesh with conductors.

For example, three of the aforedescribed positive electrodes were placed into pockets formed of polypropylene fleece and united with two negative electrodes into a single package wherein the positive electrodes being separated from one another by the negative ones. The electrode package was slipped into a rectangular casing formed of polystyrene. A 0.5 molar solution of bortrifluoride in propylene carbonate served as electrolyte. Ater having been filled with the electrolyte, the casing was airtightly sealed by a cover of polystyrole. The conductors were passed to the outside through two boreholes formed in the cover. The boreholes in the cover were then air-tightly sealed with a resin. In another mode of the method of the invention, the positive electrodes were produced from a mixture of commercial sulphur powder and ground graphite in a ratio of at most 1 : 1, with an addition of a small amount of dissolved carboximethyl-cellulose (about 2% by weight) and possibly a stabilizer, (about 0.1% to 1% by weight) the mixture having been dried for several hours in vacuum at a temperature of 80° C. These electrodes were heated to a temperature of about 150° – 200° C after the drying operation and quenched in cooled propylene carbonate. Afterwards, the electrodes were subjected to extraction with carbon disulfide and dried in vacuum at a temperature of 20° C. The negative electrodes are produced as aforedescribed and placed into a cell casing together with the positive electrodes, that are produced in accordance with the foregoing method of the invention. A solution of 0.2 mol potassium-hexafluorphosphate and 0.5 mol bortrifluoride in butyrolactone serves as the electrolyte. The production of the negative electrodes and the electrolyte as well as the assembly and closing of the cells take place, respectively, in a dry argon atmosphere.

Polypropylene, polyethylene, synthetic rubber, and polytetra-fluorethylene can be used as additional binding agent for the positive electrode mass. These binders can be added to the positive active mass either in dissolved or pulverulent form. All compounds which readily release halogen, such as halogenamide, benzylhalogenide or unsaturated alkylhalogenide, the double bond of which is conjugated with the halogen atom, are suitable as stabilizers for the amorphous insoluble sulphur. To increase the conductivity besides graphite, metal powder or carbon black can be added to the positive mass. Moreover, other metallic supports or carriers, such as of aluminum, stainless steel, and copper are suitable for the electrodes. Of special advantage, is the extremely good storage stability of galvanic cells containing positive sulphur electrodes according to the invention. In addition through the method of the invention, the current output and the voltage level are considerably improved with respect to galvanic cells known heretofore.

I claim:

1. A galvanic cell having a negative electrode formed of light metal and an electrolyte containing a conductive salt in an organic solvent, a positive sulphur electrode formed of amorphous, insoluble sulphur having an additive of conductive material.

2. Galvanic cell according to claim 1, wherein a stabilizer is dissolved in the organic solvent.

3. Galvanic cell according to claim 1, wherein a salt which increases the electrical conductivity of the electrolyte is dissolved in the organic solvent.

4. Galvanic cell according to claim 1, wherein a stabilizer and a salt which increases the electrical conductivity of the electrolyte are dissolved in the organic solvent.

* * * * *